(12) United States Patent
Bade et al.

(10) Patent No.: US 10,789,135 B2
(45) Date of Patent: Sep. 29, 2020

(54) PROTECTION OF INFRASTRUCTURE-AS-A-SERVICE WORKLOADS IN PUBLIC CLOUD

(71) Applicant: Microsoft Technology Licensing, LLC, Redmond, WA (US)

(72) Inventors: Naresh K Bade, Hyderabad (IN); Devendra Jaripiti, Hyderabad (IN); Aditya Kumar Jha, Patna (IN); Phani Prakash Boppana, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 164 days.

(21) Appl. No.: 15/890,730

(22) Filed: Feb. 7, 2018

(65) Prior Publication Data
US 2019/0243725 A1 Aug. 8, 2019

(51) Int. Cl.
*G06F 11/00* (2006.01)
*G06F 11/14* (2006.01)
(Continued)

(52) U.S. Cl.
CPC ...... *G06F 11/1464* (2013.01); *G06F 9/45558* (2013.01); *G06F 11/1451* (2013.01);
(Continued)

(58) Field of Classification Search
CPC .......................... G06F 11/1464; G06F 11/1451
See application file for complete search history.

(56) References Cited

U.S. PATENT DOCUMENTS 8,352,785 B1 * 1/2013 Nicklin ................. G06F 16/148
714/15
2012/0324183 A1 * 12/2012 Chiruvolu ........... G06F 11/2038
711/162
(Continued)

OTHER PUBLICATIONS

Nicolae, et al., "BlobCR: Efficient Checkpoint-restart for HPC Applications on IaaS Clouds using Virtual Disk Image Snapshots", In SC'11: Proceedings of International Conference for High Performance Computing, Networking, Storage and Analysis, Nov. 12, 2011, 12 Pages.
(Continued)

*Primary Examiner* — Katherine Lin
(74) *Attorney, Agent, or Firm* — Buckley, Maschoff & Talwalkar LLC

(57) ABSTRACT

A system may include a cloud-based virtual machine connected to multiple virtual hard drives and associated with a guest of a first datacenter. A recovery management server may, substantially simultaneously for each virtual hard drive, create an Infrastructure-as-a-Service snapshot of data on the virtual hard drive without utilizing an agent of the virtual machine. The recovery management server may also directly replicate the snapshot of data for each virtual hard drive at a second datacenter, which may be geographically remote from the first datacenter, without re-creating Input Output ("IO") operations for each virtual hard drive via a log file. Upon an indication of failure of the first datacenter, the recovery management server may arrange to have each virtual hard drive's replicated snapshot of data be consumed by a recovery service for the guest at the second datacenter.

20 Claims, 6 Drawing Sheets

(51) Int. Cl.
*G06F 9/455* (2018.01)
*G06F 11/20* (2006.01)
*G06F 11/16* (2006.01)

(52) U.S. Cl.
CPC ...... *G06F 11/1662* (2013.01); *G06F 11/2025* (2013.01); *G06F 11/2048* (2013.01); *G06F 11/2097* (2013.01); *G06F 11/2094* (2013.01); *G06F 2009/4557* (2013.01); *G06F 2009/45579* (2013.01); *G06F 2201/84* (2013.01)

(56) References Cited

U.S. PATENT DOCUMENTS

| | | | | |
|---|---|---|---|---|
| 2013/0305005 | A1* | 11/2013 | Calder | G06F 3/0604 711/162 |
| 2015/0135003 | A1* | 5/2015 | Cota-Robles | G06F 11/1666 714/6.3 |
| 2016/0198003 | A1* | 7/2016 | Luft | H04L 12/46 709/225 |
| 2017/0235525 | A1 | 8/2017 | Calder et al. | |

OTHER PUBLICATIONS

"International Search Report and Written Opinion Issued in PCT Application No. PCT/US19/014853", dated Apr. 23, 2019, 13 Pages.

* cited by examiner

PROTECTION OF INFRASTRUCTURE-AS-A-SERVICE WORKLOADS IN PUBLIC CLOUD

BACKGROUND

An enterprise may want to make various computer functions, such as applications, database servers, and websites, available to employees, clients, customers, etc. To support these functions, the enterprise might maintain computer hardware and employee Information Technology ("IT") professionals to ensure that such services are available. This approach, however, can be an expensive and time-consuming process. In some cases, the enterprise may instead utilize a cloud-based implementation where common computing resources are shared among many different enterprises. For example, a public cloud service may establish an Infrastructure-as-a-Service ("IaaS") approach such that a datacenter implements one or more virtual machines to provide computer functionality for the enterprise.

Note that it may be important that computer functionality be available even when a failure occurs (e.g., specific cloud-based hardware serving the enterprise loses power). In particular, data associated with the virtual machines at a first datacenter (including, for example, workload data stored on virtual hard drives) may need to be quickly re-created at a second cloud-based datacenter when a failure occurs. To help with this process, an agent executing in the virtual machine may keep Input Output ("IO") log files as information is written to and/or read from various virtual hard drives. Such an approach, however, can reduce the virtual machine's computing resources and be relatively inefficient.

What is needed is a system to protect IaaS workloads in a public cloud environment while efficiently allowing information to be re-created at another datacenter when a failure occurs.

DETAILED DESCRIPTION

The following description is provided to enable any person in the art to make and use the described embodiments. Various modifications, however, will remain readily apparent to those in the art.

Generally, some embodiments provide an efficient system-level solution for to protect IaaS workloads (e.g., data on virtual hard drives) in a public cloud environment while efficiently allowing information to be re-created at another datacenter when a failure occurs.

Some embodiments address the technical problem of efficiently creating snapshots of virtual hard drive data. A technical solution to the technical problem, according to some embodiments, includes providing software and/or hardware logic to use such snapshots to re-create the virtual hard drives without the use of a virtual machine agent or IO log files.

Figure 1:
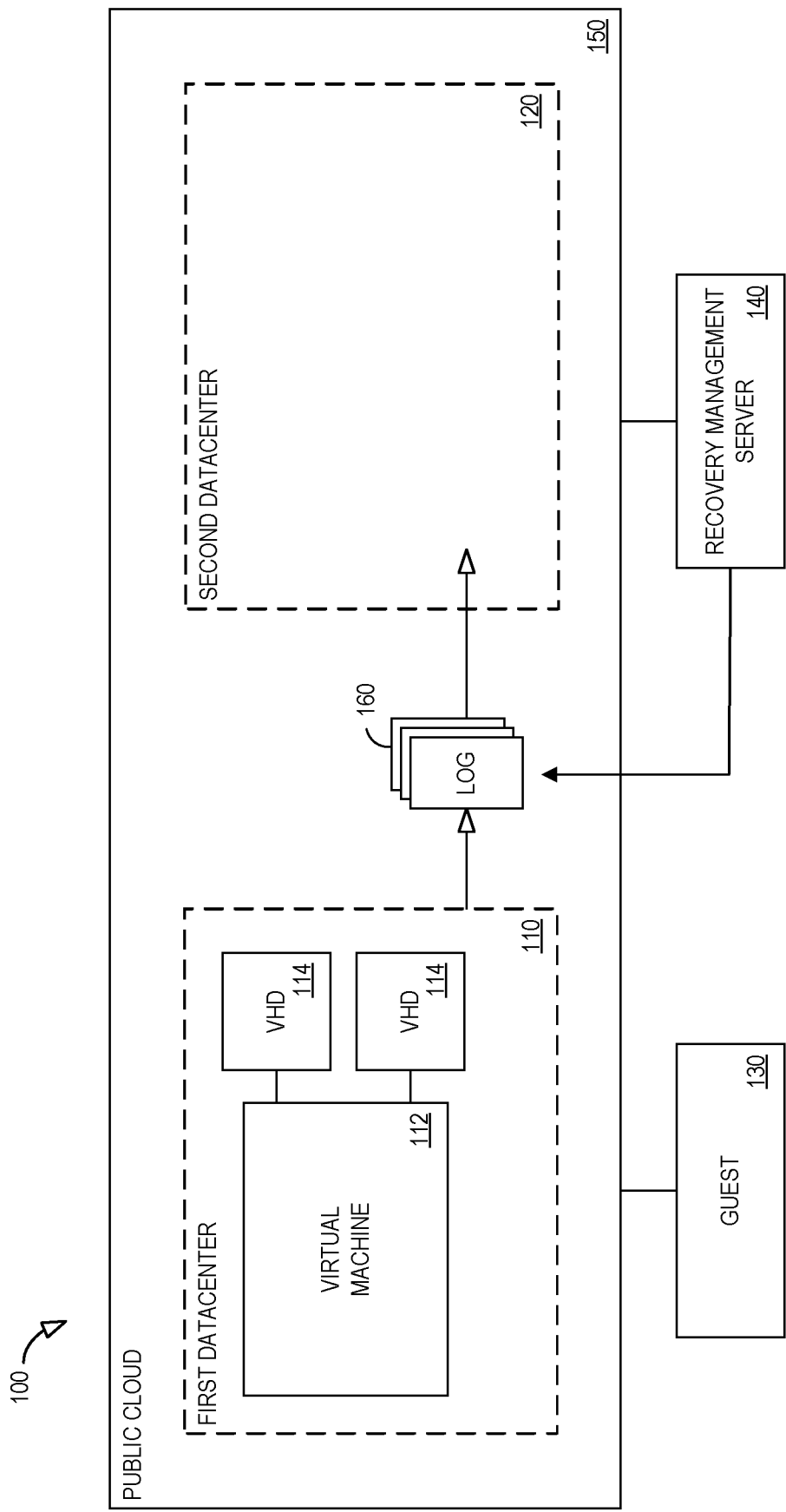
FIG. 1 is a high-level block diagram of a system architecture.

FIG. 1 is a high-level block diagram of a system 100 architecture in which a first datacenter 110 of a public cloud 150 provides IaaS computer services for a guest 130. In particular, a virtual machine 112 with one or more connected virtual hard drives 114 executing at the first datacenter 110 may provide the IaaS computer services for the guest 130.

In the event of a failure of the first datacenter 110, it may be desirable to re-create the virtual machine 112, including the information stored on the virtual hard drives 114, at a second datacenter 120 (e.g., located a geographically remote location and therefore unlikely to experience the same failure) in the public cloud 150. A recovery management server 140 may facilitate such a recovery process. Typically, all of the writes to virtual hard drives 114 from the running virtual machine 112 are captured to a log file 160 which is transported to a staging storage account. This log file 160 is again read from a service hosted in the second datacenter 120, parsed, and the written on-to a corresponding virtual hard drive at the recovery location.

Note that such an approach involves multiple duplications of the same write, in the form of capturing them to the log file 160, moving the information to a staging storage account, reading the data from staging storage account, and finally writing back the operation into the virtual hard drive at the second datacenter 120. Some embodiments described herein may use a native hypervisor, such as a Hyper-V Replica ("HVR") available from MICROSOFT CORPORATION®. For example, a virtualization driver for disk (e.g., vhdmp.sys) multi-stage snapshot infra-structure and a pause/resume IO infrastructure may be accessed, such as the functionality available in the HVR platform. Note that log files 160 (which are traditionally used to capture virtual hard drive 114 writes) may be skipped in some embodiments because there is an option to directly create the virtual hard drive 114 snapshot. With the increased use of Field-Programmable Gate Arrays ("FPGAs") allowing fast-interconnect between compute and storage in hardware, log files 160 may increasingly become an unnecessary compute and/or IO overhead on nodes hosting the virtual machine 112 being protected.

Figure 2:
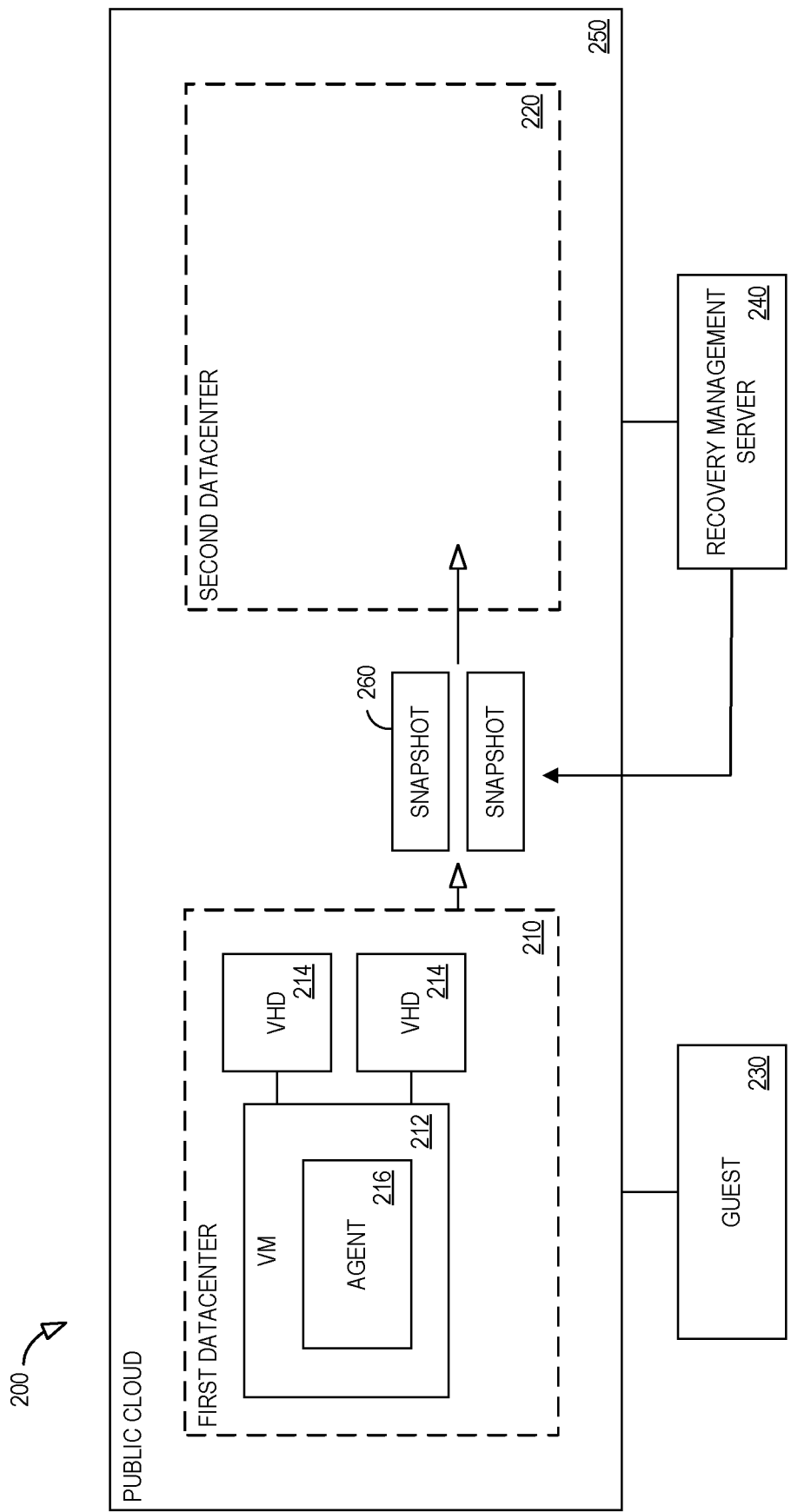
FIG. 2 is a high-level block diagram of a system architecture utilizing snapshots.

Instead of using log files 160 to facilitate recovery, some implementations may utilize snapshots. For example, FIG. 2 is a high-level block diagram of a system 200 architecture according to some embodiments. As before, a first datacenter 210 of a public cloud 250 may include a virtual machine 212 with one or more connected virtual hard drives 214 executing at the first datacenter 210 to provide the IaaS computer services for a guest 230. In the event of a failure of the first datacenter 210, it may be desirable to re-create the virtual machine 212, including the information stored on the virtual hard drives 214, at a second datacenter 220 (e.g., located a geographically remote location and therefore unlikely to experience the same failure) in the public cloud 250. A recovery management server 240 may facilitate such a recovery process.

To protect the IaaS virtual machine 212 workloads in the public cloud 250, a snapshot 260 may be taken of each virtual hard drive 214 at substantially the same time—thus preserving the integrity of the data for recovery. Note that virtual hard drives 214 that are backed by storage service blobs might be snapshotted using blob snapshots while virtual hard drives 214 which are backed by local files may not be protected (thereby eliminating the need for local processing of snapshots). To facilitate creation of the snapshot 260, an agent 216 may be installed in the virtual machine 212 of the first datacenter 210. The agent 216 may consume virtual machine 212 resources such as Central Processing Unit ("CPU") resources and/or network resources (e.g., to write information to a staging location).

Note that virtual machines 212 running in the public cloud 250 may need protection against any disaster and the virtual machines 212 should be able to start running from a geographically safe datacenter (e.g., the second datacenter 220) with minimal data loss when disaster strikes. Moreover, write-order preservation may be an important requirement to make sure there is no data loss during the virtual machine recovery operation.

Figure 3:
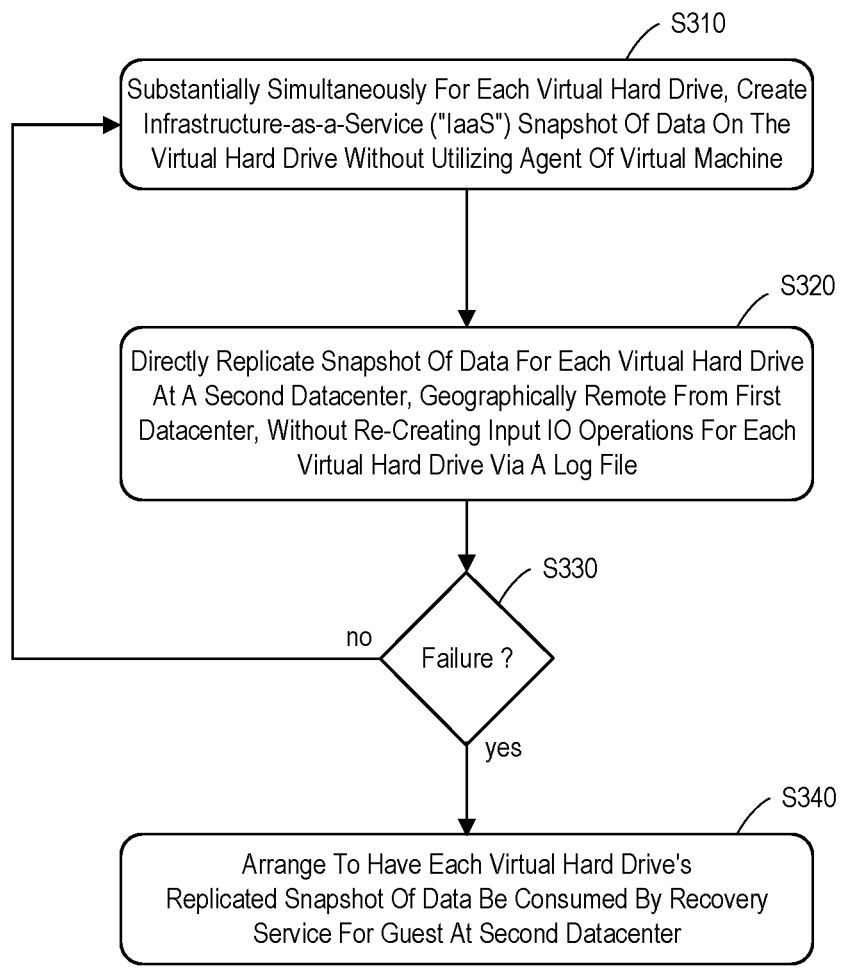
FIG. 3 is a flow diagram of a process to protect IaaS workloads in a public cloud in accordance with some embodiments.

Some embodiments described herein disclose a log-less, guest-agnostic way to create IaaS virtual machine 212 snapshots to be consumed by a recovery service such as the Azure Site Recovery service available from MICROSOT CORPORATON®. FIG. 3 is a flow diagram of a process to protect IaaS workloads in a public cloud in accordance with some embodiments. The process may be used with, for example, a cloud-based virtual machine connected to multiple virtual hard drives and associated with a guest of a first datacenter. At S310, the system may, substantially simultaneously for each virtual hard drive, create an IaaS snapshot of data on the virtual hard drive without utilizing an agent of the virtual machine. According to some embodiments, each snapshot of data on the virtual hard drive is associated with storage service Binary Large Objects ("BLOBs"). At S320, the system may directly replicate the snapshot of data for each virtual hard drive at a second datacenter, geographically remote from the first datacenter, without re-creating IO operations for each virtual hard drive via a log file.

At S330, it is determined if there is a failure at the first datacenter. If there is no failure at S330, the process may be continued at S310 (e.g., to collect additional snapshots on a periodic basis). According to some embodiments, the creation and replication may be performed, for example, every fifteen minutes, every five minutes, every thirty seconds, etc. depending on the recovery needs of the guest. Upon an indication of failure of the first datacenter at S330, the system may arrange to have each virtual hard drive's replicated snapshot of data be consumed by a recovery service at S340 for the guest at the second datacenter. In this way, the recovery service may recreate the virtual machine and connected virtual hard drives at the second datacenter (which might be geographically remote from the first datacenter).

Figure 4:
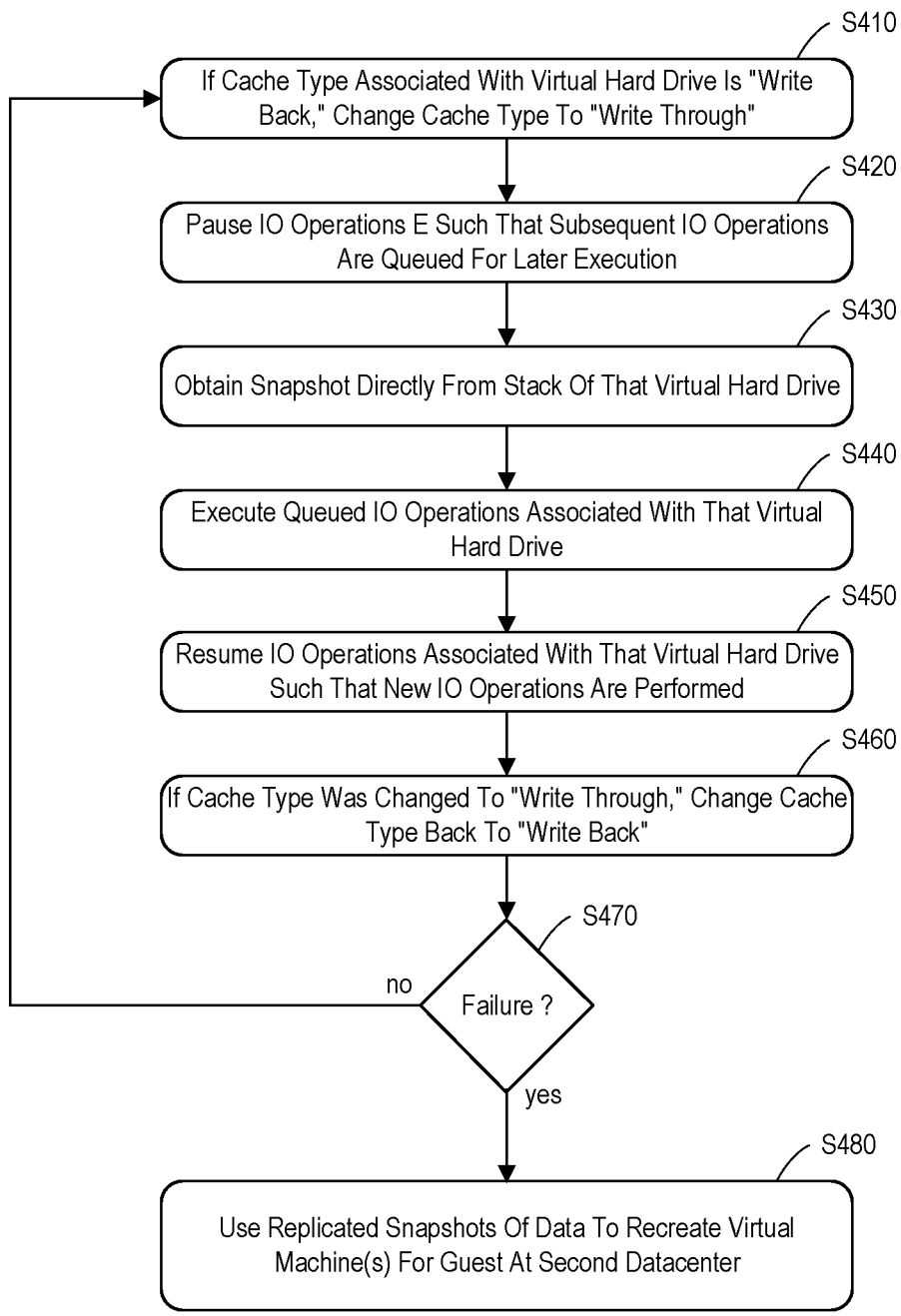
FIG. 4 is a flow diagram of a process to protect IaaS workloads in a public cloud according to some embodiments.

Note that the creation of snapshots might be performed in a number of different ways. For example, FIG. 4 is a flow diagram of a process that uses a multi-stage snapshotting mechanism according to some embodiments. According to some embodiments, for each XStore disk attached to a virtual machine, a recovery management platform may perform steps S410 through S460. If a cache type associated with that virtual hard drive is "write back" at S410, the recovery management platform may change the cache type to "write through." As used herein, a "write back" cache may write IO directly to cache and completion is immediately confirmed while a "write through" cache may write IO onto cache and through to underlying permanent storage before confirming.

At S420, the recovery management platform may pause IO operations associated with that virtual hard drive such that subsequent IO operations are queued for later execution. That is, all of the IO to the virtual hard drive will be queued and no new IO will reach the virtual hard drive. At S430, the recovery management server may obtain a snapshot directly from a stack of that virtual hard drive. For example, the system may take an XStore snapshot directly from virtual hard drive stack. Note that the creation of the IaaS snapshot of data might be associated with a native hypervisor virtualization driver for disks.

At S440, the recovery management server may execute the queued IO operations associated with that virtual hard drive (e.g., all the queued IO is released to reach the virtual hard drive) and IO operations associated with that virtual hard drive may be resumed at S450 such that new IO operations are performed. If the cache type of that virtual hard drive was changed to "write through" at S460, the recovery management server may change the cache type back to "write back." According to some embodiments, the virtual machine is associated with an operating system virtual hard drive having a cache type of "write back" and at least one data virtual hard drive having cache type of "write through" (e.g., a default IaaS virtual machine setup may be such that only OS disk has the write caches enabled and all the data disks are set up for write-through).

According to some embodiments, a virtualization storage stack may be enhanced with an IO control ("IOCTL") interface that creates a snapshot from kernel-mode. For example, to implement the multi-stage snapshotting, an XDISK layer in RdSSD/ABC stack may need to be enhanced to have an IOCTL interface that creates XStore snapshots from kernel-mode. These IOCTLs may be called, for example, during the multi-stage snapshot implemented in vhdmp.sys/vhddisk.sys so that they can synchronously create the snapshot at the end of five stages. According to some embodiments, a control plane may coordinate operations across the virtual hard drives connected to the virtual machine. Given that the control plane may coordinate all stages across all virtual hard drives connected to the virtual machine, the write order may be preserved.

Figure 5:
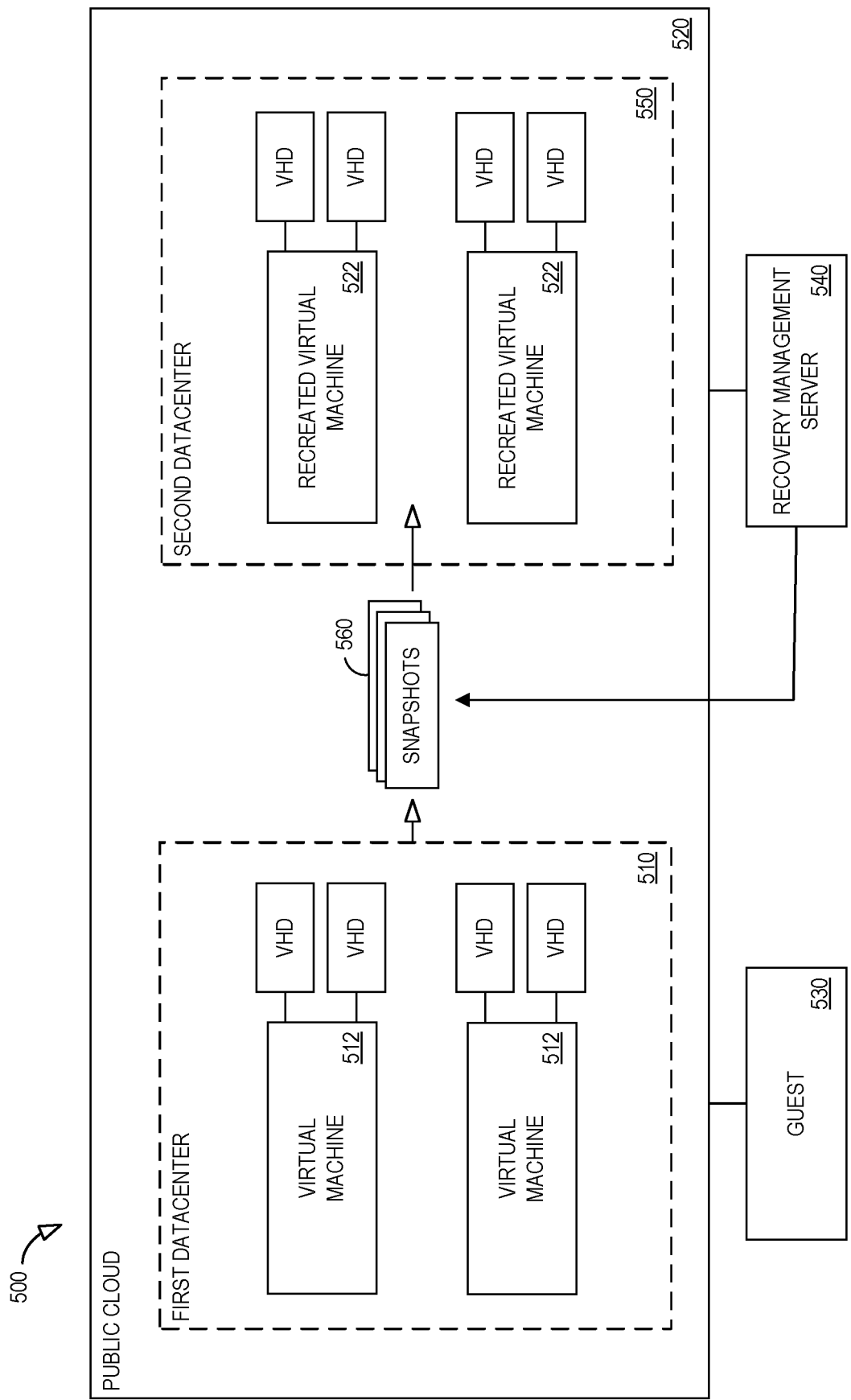
FIG. 5 is a high-level block diagram of a system architecture in accordance with some embodiments.

FIG. 5 is a high-level block diagram of a system architecture 500 in accordance with some embodiments. In particular, a first datacenter 510 of a public cloud 550 includes multiple virtual machines 512, each with with one or more connected virtual hard drives, executing at a first datacenter 510 to provide the IaaS computer services for a guest 530. In the event of a failure of the first datacenter 510, it may be desirable to re-create the virtual machine 512, including the information stored on the virtual hard drives, at a second datacenter 520 (e.g., located a geographically remote location and therefore unlikely to experience the same failure) in the public cloud 550. A recovery management server 540 may facilitate such a recovery process.

To protect the IaaS virtual machine 512 workloads in the public cloud 550, according to some embodiments snapshots 560 may be taken of each virtual hard drive at substantially the same time—thus preserving the integrity of the data for recovery. According to some embodiments, virtual hard drives that are backed by storage service blobs are snapshotted using blob snapshots while virtual hard drives which are backed by local files may not be protected (thereby eliminating the need for local processing of snapshots).

Note that virtual machines 512 running in the public cloud 550 may need protection against any disaster and the virtual machines 512 should be able to start running from a geographically safe datacenter (e.g., the second datacenter 520) with minimal data loss when disaster strikes. Thus, some embodiments described herein disclose a log-less, guest-agnostic way to create IaaS virtual machine 512 snapshots 560 to be consumed by a recovery service such as the Azure Site Recovery. The recovery service may then use the snapshots 560 to recreate virtual machines 522 and connected virtual hard drives at the second datacenter 550 for the guest.

Thus, some embodiments described herein may avoid using both log files and agents running within virtual machines. In this way, the system 500 may efficiently automate the recovery of services when a site outage happens at the first datacenter 510. The system 500 may bring over applications in an orchestrated way to help restore service quickly, even for complex multi-tier workloads. The guest 530 may create disaster recovery plans as simple or advanced as needed by an enterprise, including the execution of customized scripts, runbooks, and pauses for manual intervention. The system 500 may customize networks by mapping virtual networks between the first datacenter 510 and the second datacenter 520, and the guest 530 might test disaster recovery plans using the snapshot 560 information without disrupting services.

In addition to protecting data, embodiments described herein may also help ensure that applications stay available during an IT interruption and that downtime (and data loss) is limited. In this way, the recovery management platform 540 may help the guest 530 adopt a Business Continuity and Disaster Recovery ("BCDR") strategy that keeps enterprise data safe, while helping ensure that apps and workloads are up and running when planned and/or unplanned outages occur. The system 500 may efficiently replicate workloads running on physical and virtual machines from the first datacenter 510 to the second datacenter 550. When an outage occurs at first datacenter 510, the virtual machine 512 of the guest 530 fails over to the second location 520, and apps may be accessed from there. When the first datacenter 510 is running again, the apps can fail back to execute from there. Embodiments may replicate any workload running on a virtual machine, including on-premises Hyper-V and VMware VMs, and Windows/Linux physical servers.

Embodiments described herein may help an enterprise keep Recovery Time Objectives ("RTO") and Recovery Point Objectives ("RPO") within organizational limits. The system 500 might, for example, provide continuous replication for virtual machines and/or VMware virtual machines with a replication frequency as low as, for example, 30 seconds for Hyper-V. The system 500 may perform replication using recovery points with application-consistent snapshots that capture disk data, data in memory, and/or transactions in process.

Figure 6:
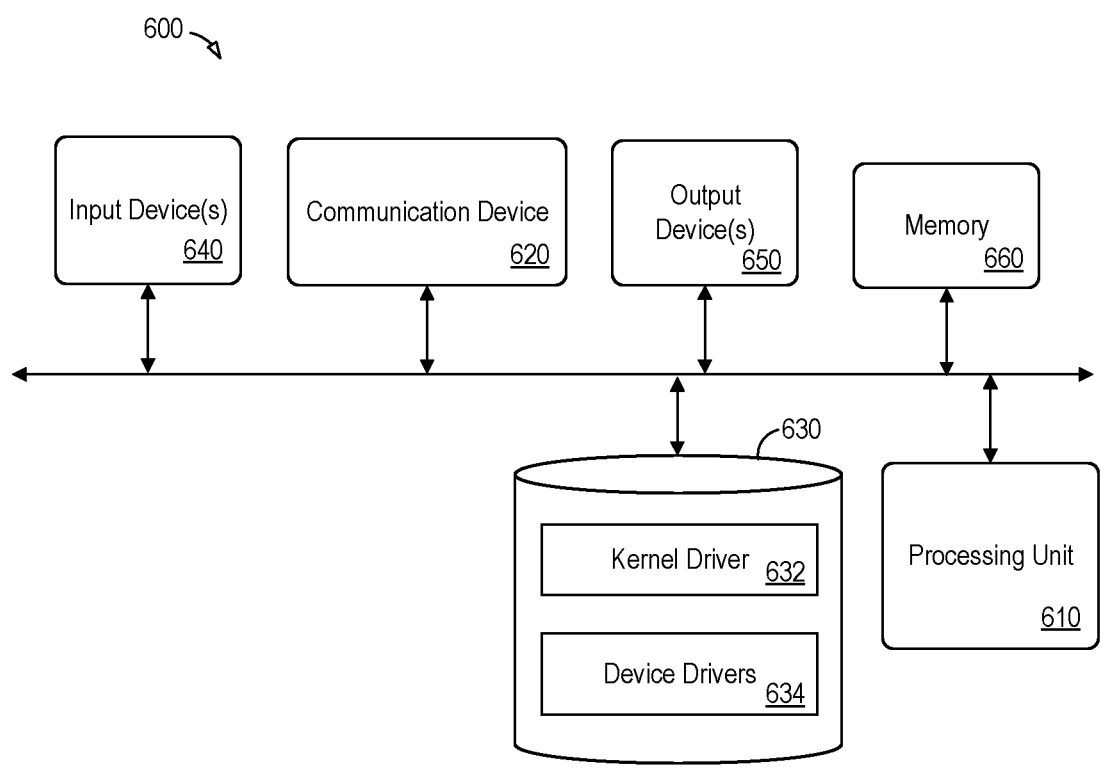
FIG. 6 is a block diagram of a recover management server according to some embodiments.

FIG. 6 is a block diagram of a recover management server 600 according to some embodiments. The recovery management server 600 may comprise a general-purpose data server and may execute program code to perform any of the functions described herein. Recovery management server 600 may include other un-shown elements according to some embodiments.

According to some embodiments, the recovery management server 600 may include a processing unit 610 operatively coupled to a communication device 620, a data storage system 630, one or more input devices 640, one or more output devices 650, and volatile memory 660. The processing unit 610 may comprise one or more processors, processing cores, etc. for executing program code. The communication device 620 may facilitate communication with external devices, such as remote application servers and data servers. The input device(s) 640 may comprise, for example, a keyboard, a keypad, a mouse or other pointing device, a microphone, a touch screen, and/or an eye-tracking device. The output device(s) 650 may comprise, for example, a display (e.g., a display screen), a speaker, and/or a printer.

The data storage system 630 may comprise any number of appropriate persistent storage devices, including combinations of magnetic storage devices (e.g., magnetic tape, hard disk drives and flash memory), optical storage devices, Read Only Memory ("ROM") devices, etc. Memory 660 may comprise Random Access Memory ("RAM"), Storage Class Memory ("SCM"), and/or any other fast-access memory.

The kernel driver 632 and device driver 634 may comprise program code executed by processing unit 610 to cause recovery management server 600 to perform any one or more of the processes described herein. In this regard, the server 600 may, substantially simultaneously for each virtual hard drive, create an IaaS snapshot of data on the virtual hard drive without utilizing an agent of the virtual machine. The recovery management server 600 may also directly replicate the snapshot of data for each virtual hard drive at a second datacenter, which may be geographically remote from the first datacenter, without re-creating IO operations for each virtual hard drive via a log file. Upon an indication of failure of the first datacenter, the recovery management server 600 may arrange to have each virtual hard drive's replicated snapshot of data be consumed by a recovery service for the guest at the second datacenter. The data storage device 630 may also store data and other program code for providing additional functionality and/or which are necessary for operation of the recovery management server 600, such as other device drivers, operating system files, recovery service interactions, etc.

Thus, embodiments may provide a guest-agnostic way of creating IaaS virtual machine snapshots that can be consumed by recovery services. Moreover, this function can be performed without requiring the user to install any external agent inside the virtual machine. In addition, embodiments may provide a log-less way of replicating a virtual hard drive to a geographically safe datacenter. This may help ensure that a write that happened on the primary location is transported to the recovery location only once. Further, embodiments may not require a costly resynchronization between primary and recovery virtual hard drives located across different datacenters (in case of any transfer losses).

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
   a cloud-based virtual machine connected to multiple virtual hard drives and associated with a guest of a first datacenter; and a recovery management server including a processing unit to execute program code to cause the recovery management server to:
for each virtual hard drive, pause input output (IO) operations and create an Infrastructure-as-a-Service ("IaaS") snapshot from a software stack of the virtual hard drive while the IO operations are paused;
replicate the snapshot from the software stack for each virtual hard drive at a second datacenter; and
upon an indication of failure of the first datacenter, arrange to have each virtual hard drive's replicated snapshot be consumed by a recovery service for the guest at the second datacenter.

2. The system of claim 1, wherein the creation of each IaaS snapshot of data comprises, for each virtual hard drive:
if a cache type associated with that virtual hard drive is "write back," changing the cache type to "write through,"
queuing subsequent IO operations that are received for later execution,
obtaining the snapshot directly from the software stack of that virtual hard drive,
executing the queued IO operations associated with that virtual hard drive,
resuming IO operations associated with that virtual hard drive such that new IO operations are performed, and
if the cache type of that virtual hard drive was changed to "write through," changing the cache type back to "write back."

3. The system of claim 1, wherein the creation of the IaaS snapshot of data is associated with a native hypervisor virtualization driver for disks.

4. The system of claim 1, wherein the processing unit is further configured to change a virtual hard drive having a cache type of "write back" to a virtual hard drive having cache type of "write through."

5. The system of claim 1, wherein a virtualization storage stack is enhanced with an IO control interface that creates the snapshot from kernel-mode.

6. The system of claim 1, wherein a control plane coordinates operations across the virtual hard drives connected to the virtual machine.

7. The system of claim 1, wherein each snapshot of data on the virtual hard drive is associated with storage service binary large objects.

8. The system of claim 1, wherein said creation and replication are performed on a periodic basis.

9. The system of claim 1, wherein the recovery service recreates the virtual machine and connected virtual hard drives at the second datacenter, wherein the second datacenter is geographically remote from the first datacenter.

10. A computer-implemented method associated with a cloud-based virtual machine connected to multiple virtual hard drives and associated with a guest of a first datacenter, comprising:
for each virtual hard drive, pausing input output (IO) operations and creating an Infrastructure-as-a-Service ("IaaS") snapshot from a software stack of the virtual hard drive while the IO operations are paused;
replicating the snapshot of data for each virtual hard drive at a second datacenter; and
upon an indication of failure of the first datacenter, arranging to have each virtual hard drive's replicated snapshot of data be consumed by a recovery service for the guest at the second datacenter.

11. The method of claim 10, wherein said creation of each IaaS snapshot of data comprises, for each virtual hard drive:
if a cache type associated with that virtual hard drive is "write back," changing the cache type to "write through,"
queuing subsequent IO operations that are received for later execution,
obtaining the snapshot directly from the software stack of that virtual hard drive,
executing the queued IO operations associated with that virtual hard drive,
resuming IO operations associated with that virtual hard drive such that new IO operations are performed, and
if the cache type of that virtual hard drive was changed to "write through," changing the cache type back to "write back."

12. The method of claim 10, wherein the creation of the IaaS snapshot of data is associated with a native hypervisor virtualization driver for disks.

13. The method of claim 10, further comprising changing a virtual hard drive having a cache type of "write back" to a virtual hard drive having cache type of "write through."

14. The method of claim 10, wherein a virtualization storage stack is enhanced with an IO control interface that creates the snapshot from kernel-mode.

15. The method of claim 10, wherein a control plane coordinates operations across the virtual hard drives connected to the virtual machine.

16. The method of claim 10, wherein each snapshot of data on the virtual hard drive is associated with storage service binary large objects.

17. The method of claim 10, wherein said creation and replication are performed on a periodic basis and the recovery service recreates the virtual machine and connected virtual hard drives at the second datacenter.

18. A system, comprising:
a cloud-based virtual machine connected to multiple virtual hard drives and associated with a guest of a first datacenter; and
a recovery management server including a processing unit to execute program code to cause the recovery management server to:
substantially simultaneously for each virtual hard drive, create an Infrastructure-as-a-Service ("IaaS") snapshot of storage service binary large objects on the virtual hard drive without utilizing an agent of the virtual machine, wherein the creation of each IaaS snapshot of data includes, for each virtual hard drive:
if a cache type associated with that virtual hard drive is "write back," changing the cache type to "write through,"
pausing Input Output ("IO") operations associated with that virtual hard drive such that subsequent IO operations are queued for later execution,
obtaining a snapshot directly from a stack of that virtual hard drive,
executing the queued IO operations associated with that virtual hard drive,
resuming IO operations associated with that virtual hard drive such that new IO operations are performed, and
if the cache type of that virtual hard drive was changed to "write through," changing the cache type back to "write back;"
directly replicate the snapshot of storage service binary large objects for each virtual hard drive at a second datacenter, geographically remote from the first datacenter, without re-creating IO operations for each virtual hard drive via a log file; and upon an indication of failure of the first datacenter, arrange to have each virtual hard drive's replicated snapshot of storage service binary large objects be consumed by a recovery service for the guest at the second datacenter.

19. The system of claim 18, wherein said creation and replication are performed on a periodic basis.

20. The system of claim 18, wherein the recovery service recreates the virtual machine and connected virtual hard drives at the second datacenter.

* * * * *